United States Patent Office 3,171,843
Patented Mar. 2, 1965

3,171,843
WATER-SOLUBLE ANTHRAQUINONE DYES AND PROCESS FOR THEIR PRODUCTION
Hermann Weissauer, Ludwigshafen (Rhine), and Willy Braun, Heidelberg, Germany, assignors to Badische Anilin- & Soda-Fabrik Aktiengesellschaft, Ludwigshafen (Rhine), Germany
No Drawing. Filed Aug. 4, 1961, Ser. No. 129,218
Claims priority, application Germany, Aug. 13, 1960, B 58,963
3 Claims. (Cl. 260—372)

This invention relates to new water-soluble anthraquinone dyes of the general formula

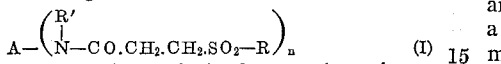  (I)

in which A represents the radical of an anthraquinone dye bearing at least one water-solubilizing group, R' is a hydrogen atom or an alkyl radical, R is an alkyl radical, an aralkyl radical, a cycloalkyl radical, an aryl radical or a heterocyclic radical and $n$ represents a whole number which is equal to or greater than 1. The invention also relates to a process for the manufacture of dyes of the aforesaid kind. Furthermore, the invention relates to textile goods of cellulose which have been dyed and/or printed with the aforesaid dyes.

We have found that new and valuable anthraquinone dyes may be obtained by reacting acylating agents, which give off the radical of the general formula $$-\overset{\underset{\|}{O}}{C}-CH_2-CH_2-SO_2-R$$  (II)

in which R is an alkyl radical, an aralkyl radical, a cycloalkyl radical, an aryl radical or a heterocyclic radical, with anthraquinone dyes, which bear at least one water-solubilizing group and at least one acylatable amino group, to form β-sulfonylpropionyl amide derivatives.

Suitable water-solubilizing groups are above all water-solubilizing groups, such as carboxyl groups and especially sulfonic acid groups. As acylatable amino groups primary amino groups are preferred, but secondary amino groups may also be used. Acylating agents, which give off the radical of the general Formula II, include the corresponding β-sulfonylpropionyl halides, such as the chloride or the bromide, or the corresponding β-sulfonylpropionyl anhydride.

The new dyes have the general formula

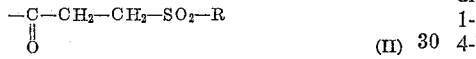  (I)

in which A represents the radical of an anthraquinone dye bearing at least one water-solubilizing group, preferably at least one sulfonic acid group, R' is a hydrogen atom or an alkyl radical, preferably of low molecular weight, R is an aralkyl radical, a cycloalkyl radical, a heterocyclic radical or advantageously an alkyl radical, preferably of low molecular weight, or an unsubstituted or substituted aryl radical, and $n$ represents a whole number which is equal to or greater than 1, preferably 1 or 2.

As aryl radicals we prefer the monovalent radicals of aromatic hydrocarbons, which consist of at the most two condensed benzene nuclei, such as phenyl radicals or naphthyl radicals.

Of particular technical interest are the new dyes of the general formulae

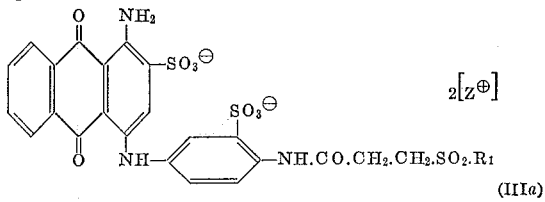

(IIIa)

and

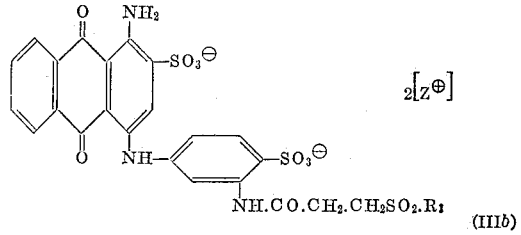

(IIIb)

in which $Z^{\oplus}$ is a cationic radical, for example a proton, an ammonium cation or an alkali metal cation, such as a sodium or a potassium cation and $R_1$ represents a low molecular weight straight chained or branched alkyl radical, such as a methyl, ethyl, isopropyl or n-butyl radical, or a phenyl radical which may be substituted. Suitable substituted phenyl radicals are phenyl radicals substituted by methyl groups, methoxy groups, nitro groups and/or halogen atoms, such as chlorine or bromine atoms.

Anthraquinone dyes which exhibit at least one, advantageously up to three, water-solubilizing groups and which contain at least one, preferably up to two, primary and/or secondary amino groups include 1,5-diaminoanthraquinone-2-sulfonic acid, 1,4-diaminoanthraquinone-2-sulfonic acid, 1,4-diaminoanthraquinone-2,5- and -2,6-disulfonic acid, the reaction products of one mole of 1-amino-4-bromoanthraquinone-2-sulfonic acid, 1-amino-4-bromoanthraquinone-2-carboxylic acid or 1-amino-4-bromoanthraquinone-2,5- or -2,6-disulfonic acid with one mole of an aromatic diamine, such as 1,3- or 1,4-diaminobenzene, 1,3-diaminobenzene-4-sulfonic acid or 1,4-diaminobenzene-2-sulfonic acid, 2,5-diaminobenzene-1,3-disulfonic acid, 4,4'-diaminodiphenylsulfide-2,2'-disulfonic acid, 4,4'-diaminostilbene-2,2'-disulfonic acid, 4,4'-diaminodiphenyl-2,2'-disulfonic acid, 4,4'-diaminodiphenylamine and 4,4'-diaminodiphenyl-3-sulfonic acid or of an aliphatic amine, such as ethylene diamine or propylene diamine.

Further initial dyes that may be used for the process according to the invention are obtainable in various ways, for example by reaction of one mole of leuco-1,4-diaminoanthraquinone, leuco-1,4 - dihydroxyanthraquinone or perylenetetracarboxylic acid di-imide with two moles of an aromatic diaminosulfonic acid, such as 1,3- or 1,4-diaminobenzene sulfonic acid or mixtures thereof.

The acylating agents, which give off the radical of the general Formula II, may be derived from various β-sulfonyl propionic acids, for example from β-phenylsulfopropionic acid, β-methylsulfopropionic acid, β-[naphthyl-(1)-or-(2)]sulfopropionic acid, β-benzylsulfopropionic acid, β-(4)-methoxyphenyl)-sulfopropionic acid, β-(4-methylphenyl-)sulfopropionic acid, β-(4-chlorophenyl)-sulfopropionic acid or β-(4-nitrophenyl)-sulfopropionic acid.

The acid chlorides or anhydrides obtainable from these carboxylic acids in conventional manner are as a rule reacted with the above-mentioned dyes in aqueous solution or suspension or in organic solvents such as formamide, dimethylformamide and N-methylpyrrolidone or in aqueous mixtures with organic solvents and/or thinning agents at low, ordinary or slightly elevated temperatures, advantageously in the presence of acid-binding agents such as sodium carbonate, sodium bicarbonate, potassium carbonate, sodium acetate, potassium acetate, sodium hydroxide, potassium hydroxide, triethylamine and/or pyridine.

The new dyes are useful for the dyeing and/or printing of materials in the form of sheets, films and textile materials, for example fibers, filaments, flock, knitted and woven goods of fibrous material of various kinds, for example of wool, silk, leather, synthetic linear polyamides or polyurethanes or of paper. In particular, dyes obtained according to the invention are outstandingly suited to the dyeing and/or printing of textiles from natural and/or regenerated cellulose. Dyeings and prints of very good fastness properties are obtainable therefrom by methods usual for reactive dyes, in particular outstanding fastness to wetting, to light and to rubbing.

The invention is illustrated by the following examples in which, unless stated otherwise, parts and percentages are by weight. Parts by volume bear the same relation to parts by weight as the kilogram does to the liter under standard conditions.

*Example 1*

A solution of 27.9 parts of β-phenylsulfopropionic acid chloride in 40 parts of dimethyl formamide is added in small quantities during the course of an hour to an ice-cold solution of 53.3 parts of the disodium salt of 1-amino - 4-(3-sulfo-4-aminophenylamino)-anthraquinone-2-sulfonic acid in a mixture of 530 parts of N-methyl-pyrrolidone and 5 parts of water. The mixture is stirred for an hour at 0 to +5° C. and the solution is poured into 2,000 parts of saturated aqueous sodium chloride solution. The precipitated dye is filtered off, washed free from acid with 18% aqueous sodium chloride solution and dried under reduced pressure. A dye is obtained, which in the form of the free acid has the formula:

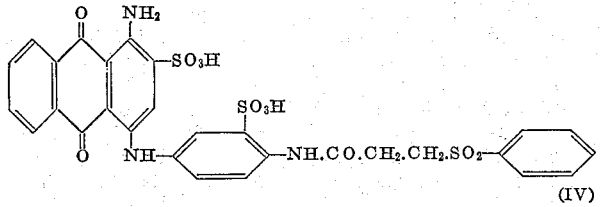

(IV)

The new dye may be used in the following manner for the dyeing of cotton:

A bleached cotton fabric is padded with a solution containing 20 parts of the dye of Formula IV in 1,000 parts by volume, squeezed to a moisture content of 90%, and dried. The fabric is then led through a further aqueous padding bath containing 15 parts of sodium hydroxide and 200 parts of sodium chloride in 1,000 parts, squeezed and steamed for 5 minutes at 110° C. and thereafter washed. There is obtained a bright blue dyeing having excellent fastness to wetting, to light and to rubbing.

The dye of Formula IV is distinguished from the dye of the formula

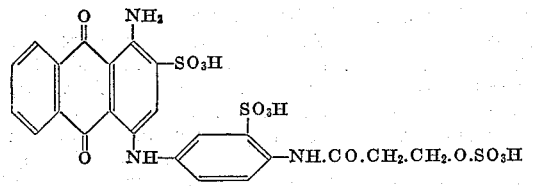

by a substantially greater depth of color of dyeings prepared therewith on cotton.

*Example 2*

300 parts of ice is introduced into a solution of 53.3 parts of the disodium salt of 1-amino-4-(3-amino-4-sulfophenylamino)-anthraquinone-2-sulfonic acid in 700 parts of water. A solution of 37 parts of β-(4-methylphenyl)-sulfopropionyl chloride in 45 parts of dimethylformamide is then added to the mixture in small quantities within half an hour. The pH of the reaction mixture is maintained at 7 by the simultaneous addition of 10% aqueous sodium carbonate solution. The reaction mixture is then stirred for about an hour at 0 to +5° C. and the new dye, which in the form of the free acid has the formula

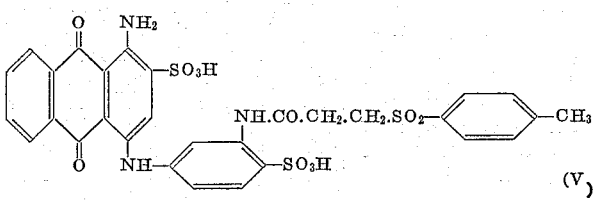

(V)

is precipitated by the addition of sodium chloride. The precipitated dye is filtered off and dried under reduced pressure. This dye gives brilliant blue dyeings having very good fastness to wet treatment and to light on cotton dyed from an alkaline bath.

The dye of Formula V is distinguished from the dye of the formula

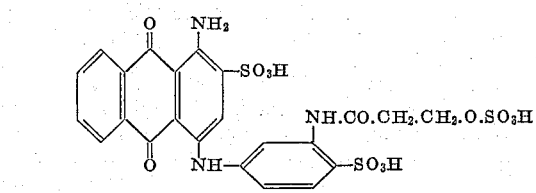

by a considerably greater depth of color of dyeings prepared therewith on cotton.

Similar dyes may be obtained in the previously stated manner from the anthraquinone derivatives and the acid chlorides listed in the following table. The new dyes dye textiles of cellulose in the stated shades.

| Example | Anthraquinone derivative | Acid chloride | Shade |
|---|---|---|---|
| 3 | ![structure] | ClOCCH₂CH₂SO₂— | Blue. |
| 4 | ![structure] | ClOCCH₂CH₂SO₂— | Do. |

| Example | Anthraquinone derivative | Acid chloride | Shade |
|---|---|---|---|
| 5 | 1-amino-2-sulfo-4-(3-aminophenylamino)-anthraquinone-sulfonic acid (NH₂, SO₃H, SO₃H, NH-C₆H₄-NH₂ substituents) | ClOCCH₂CH₂SO₂—C₆H₄—Cl | Blue. |
| 6 | 1-amino-2-sulfo-4-(4-aminophenylamino)-anthraquinone-sulfonic acid | ClOCCH₂CH₂SO₂CH₃ | Do. |
| 7 | 1,4-diamino-2,?-disulfoanthraquinone derivative (NH₂, SO₃H, SO₃H, NH₂) | ClOCCH₂CH₂SO₂—C₆H₅ | Violet. |
| 8 | 1,4-bis(4-amino-3-sulfoanilino)anthraquinone | ClOCCH₂CH₂SO₂—C₆H₄—OCH₃ | Green. |
| 9 | 1-amino-2-sulfo-4-(3-aminopropylamino)-anthraquinone-sulfonic acid (NHCH₂CH₂CH₂NH₂) | ClOCCH₂CH₂SO₂—C₆H₄—CH₃ | Reddish blue. |
| 10 | Perylene-3,4,9,10-tetracarboxylic acid bis(4-amino-3-sulfophenyl)diimide | ClOCCH₂CH₂SO₂CH₃ | Bluish red. |

What we claim is:

1. A water-soluble anthraquinone dye which in the form of the free acid has the formula

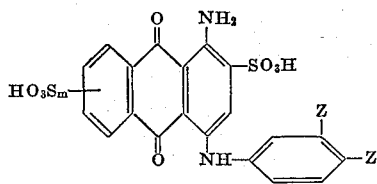

in which $m$ is one of the values 0 and 1, in which one Z is a member selected from the group consisting of hydrogen and $SO_3H$ and the other Z is the radical

—NHCOCH$_2$CH$_2$SO$_2$R wherein R is a member selected from the group consisting of lower alkyl, phenyl, naphthyl, para-chlorophenyl, para-methoxyphenyl and para-tolyl.

2. The dye which in the form of the free acid has the formula

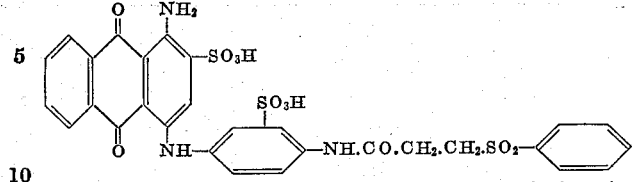

3. The dye which in the form of the free acid has the formula

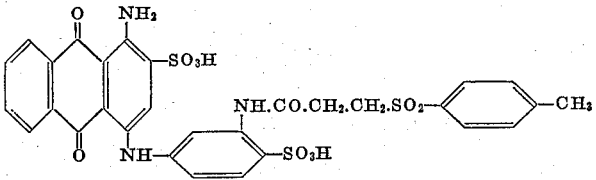

No references cited.